United States Patent
Muresan et al.

(10) Patent No.: US 8,381,132 B2
(45) Date of Patent: Feb. 19, 2013

(54) DVD MENU NAVIGATION WITH REDUCED INPUT BUTTON COUNT

(75) Inventors: Gabriel Muresan, Taipei (TW); Peter Dittmann, Taipei (TW)

(73) Assignee: Philips & Lite-On Digital Solutions Corporation, Neihu District, Taipei (TW)

(*) Notice: Subject to any disclaimer, the term of this patent is extended or adjusted under 35 U.S.C. 154(b) by 1068 days.

(21) Appl. No.: 12/101,097

(22) Filed: Apr. 10, 2008

(65) Prior Publication Data

US 2009/0259973 A1    Oct. 15, 2009

(51) Int. Cl.
*G06F 3/00* (2006.01)
*G06F 3/048* (2006.01)
*G06F 3/14* (2006.01)

(52) U.S. Cl. ........ 715/840; 715/720; 715/819; 715/820; 715/864

(58) Field of Classification Search .......... 715/840, 715/864
See application file for complete search history.

(56) References Cited

U.S. PATENT DOCUMENTS

| | | | |
|---|---|---|---|
| 5,673,401 A * | 9/1997 | Volk et al. | 725/139 |
| 5,963,704 A | 10/1999 | Mimura | |
| 6,252,592 B1 * | 6/2001 | King et al. | 715/764 |
| 6,822,664 B2 * | 11/2004 | Vale | 715/864 |
| 7,669,146 B2 * | 2/2010 | Lauff | 715/854 |
| 2001/0000668 A1 * | 5/2001 | Bodnar | 345/339 |
| 2004/0047588 A1 | 3/2004 | Okada | |
| 2005/0102634 A1 * | 5/2005 | Sloo | 715/823 |
| 2005/0232608 A1 | 10/2005 | Tanner | |
| 2007/0022367 A1 * | 1/2007 | Ingrassia et al. | 715/501.1 |
| 2007/0044038 A1 * | 2/2007 | Horentrup et al. | 715/840 |
| 2007/0065111 A1 * | 3/2007 | Shimada et al. | 386/96 |

* cited by examiner

*Primary Examiner* — Stephen Alvesteffer
(74) *Attorney, Agent, or Firm* — Winston Hsu; Scott Margo

(57) ABSTRACT

A method of the interactive features on a DVD utilizing restricted user inputs e.g. reduced number of key pad buttons. The DVD menu may be collapsed to form an indexed linear list of the menu buttons. A user then sequentially navigates through the menu using a one or two directional input to find the desired menu choice, which is then selected using a predetermined user input.

16 Claims, 8 Drawing Sheets

DVD MENU NAVIGATION WITH REDUCED INPUT BUTTON COUNT

BACKGROUND OF THE INVENTION

1. Field of the Invention

This disclosure relates to DVD menu navigation, and more specifically to methods for navigating a DVD menu using a maximum of one or two user input buttons.

2. Description of the Prior Art

The DVD Video format provides interactive features for a user during a presentation (e.g. movie). This allows browsing of the disc content using animated menus and other interactions of the user while watching the disc content. The DVD Video specification [DVD,96], Annex J, specifies a number of mandatory user operations to allow the interactive browsing of disc content. These operations include a mandatory 4-directional button navigation in menus ((Upper_Button_Select( ), Lower_Button_Select( ), Left_Button_Select( ), Right_Button_Select( )).

The internal DVD data for these buttons in menus are based on each button having assigned data for the four neighboring buttons (up/down/left/right; adjacent button information, AJBTN_POSI in PCI; [DVD,96], 4.4.3.4.(b)). These data are generated by the disc author and cannot being predicted. It can be quite complicated as the state machine 10 illustrated in FIG. 1 shows and have no correlation with the button position on the screen.

The DVD Video Specification ([DVD,96]) was designed mainly for home use and there was originally no detailed intention of mobile or automotive use. Hence the interactive features of DVD Video were designed maximizing the interactive features and thus the mandatory number of user inputs (e.g. key pad buttons) is necessary to operate the disc menu functions.

In restricted environment (mobile or automotive use) there might not be enough user controls (e.g. key pad buttons) to map all four directions on separate buttons. An alternative input method may use buttons with dual functions (e.g. short press=first function; long press=alternate function) or switching the key pad functions to an alternate function by a special selection button (e.g. like the Shift or Ctrl button on PC keyboards). This alternate input may be difficult to operate or, in the later version, require an additional Shift key, hence it fails to improve the situation.

SUMMARY OF THE INVENTION

This invention provides a method to use the interactive features on DVD Video (e.g. menu navigation) utilizing restricted user inputs opportunities, e.g. reduced number of keypad buttons.

The invention provides a method of DVD menu button selection that comprises reading a Button_Information_Table from a DVD and using a physical enumeration of menu buttons in the Button_Information_Table directly to form an indexed linear list of the menu buttons. A user then sequentially navigates through the menu using a one or two directional input to find the desired menu choice, which is then selected using a predetermined user input.

The invention further provide a second method of DVD menu button selection that includes reading original menu graph information and adjacent button information from a DVD and collapsing the original menu graph using the adjacent button information with a graph based algorithm to form a linear list. A user then sequentially navigates through the menu using a one or two directional input to find the desired menu choice, which is then selected using a predetermined user input.

The invention further provide a third method of DVD menu button selection that includes reading start and/or end X/Y coordinates of menu buttons from a DVD and sorting the coordinates of the menu buttons to collapse the buttons to a linear list. A user then sequentially navigates through the menu using a one or two directional input to find the desired menu choice, which is then selected using a predetermined user input.

The invention further provide a fourth method of DVD menu button selection that comprises generating a graph of menu functions, locating and linking menu functions in the graph according to adjacent button information read from the DVD and then collapsing the graph of menu functions into a linear list of menu functions. Again, a user then sequentially navigates through the menu using a one or two directional input to find the desired menu choice, which is then selected using a predetermined user input.

These and other objectives of the present invention will no doubt become obvious to those of ordinary skill in the art after reading the following detailed description of the preferred embodiment that is illustrated in the various figures and drawings.

DETAILED DESCRIPTION

The invention provides a method of menu navigation with a different number of directions, giving an alternative to the concept of mandatory 4-directional navigation. In the special case of automotive use, the number of directions is 1 or 2 and thus a method navigating a DVD menu with only a 2-directional or alternatively a 1-directional input while being able to process all menu items is described.

This disclosure applies to the following menu navigation possibilities:

a. rotating button in 2 directions (left and right),
b. rotating button in 1 direction (left or right), c. 2 navigation buttons—any combination of 2 from the 4 directions (up, down, left, right), d. 1 navigation button—any of the 4 directions (up, down, left, right), e. joystick type button in 2 directions—any combination of 2 from the 4 directions (up, down, left, right), f. joystick type button in 1 direction—any of the 4 directions (up, down, left, right).

Essential to the invention is a new understanding of the navigation data on a DVD Video disc described in [DVD,96], therefore allowing a bypass of the 4-directional navigation intended in the original specification. The essential feature is to ignore the adjacent button information (AJBTN_POSI POSI in PCI; [DVD,96], 4.4.3.4.(b)) as a main dependency of the buttons and collapse all the buttons in the menu to form a linear list. Navigation of this linear list is performed by incrementing (INC) or decrementing (DEC) the actual index in the list, hence only a maximum of two directions are needed to reach any button in the menu. The navigation can be linear, as the list 20 shown in FIG. 2, or circular as the list 30 shown in FIG. 3.

Also essential to the invention is that Auto_Action_Mode (BTN_POSI in PCI; [DVD,96], 4.4.3.4.(a)) is suppressed or its action delayed. This will allow the user to skip buttons in the table that otherwise will automatically activate and may therefore execute DVD commands, such as a jump to a different disc position.

Figure 4:
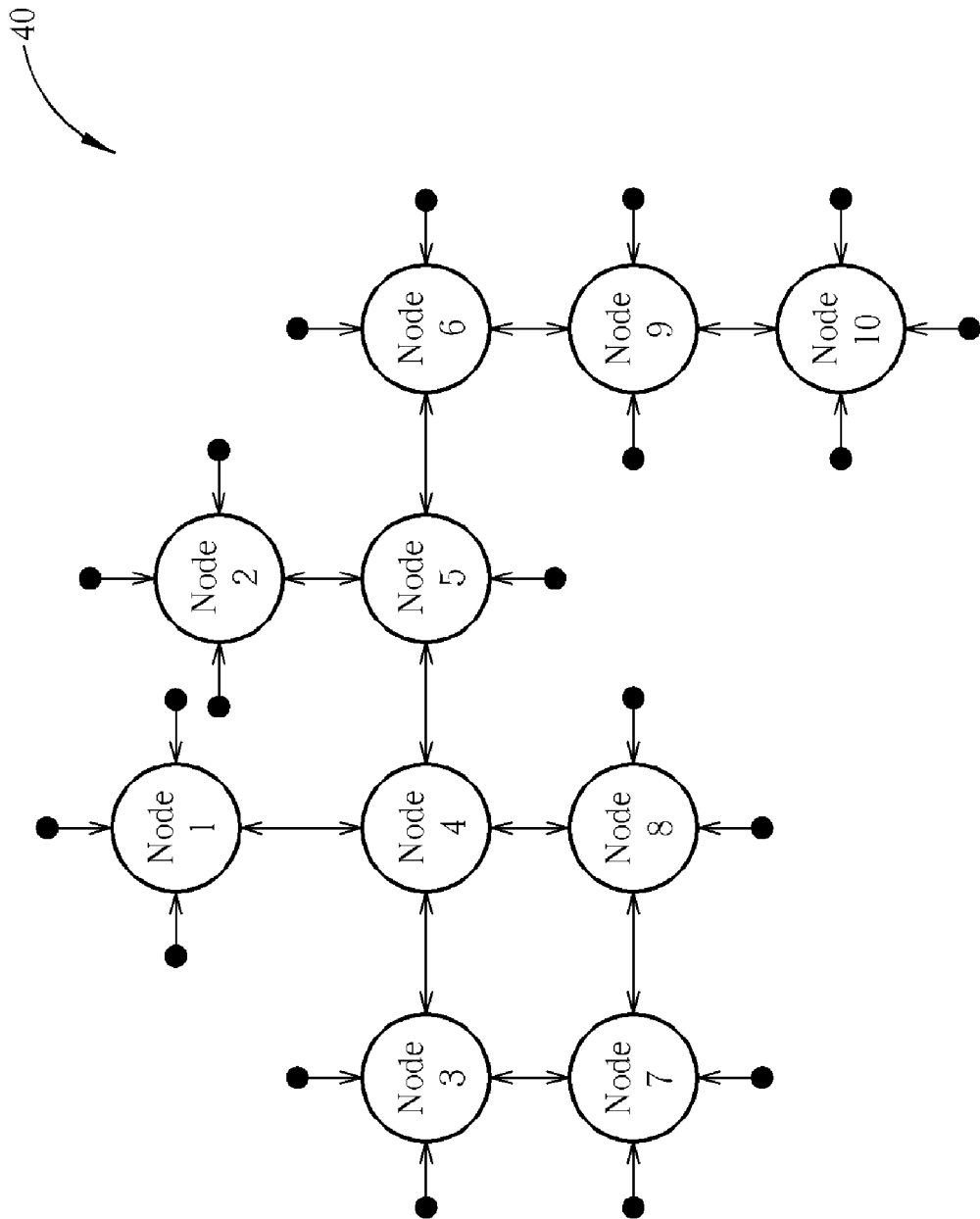
FIG. 4 is a diagram of a menu graph for providing interactive navigation features for a DVD.

To collapse the buttons graph to a linear list, several methods can be used. Such a graph 40 is shown in FIG. 4 where each node indicates a menu option and the small solid circles beginning an arrow that points to a node are considered void neighbors of that node.

Figure 5:
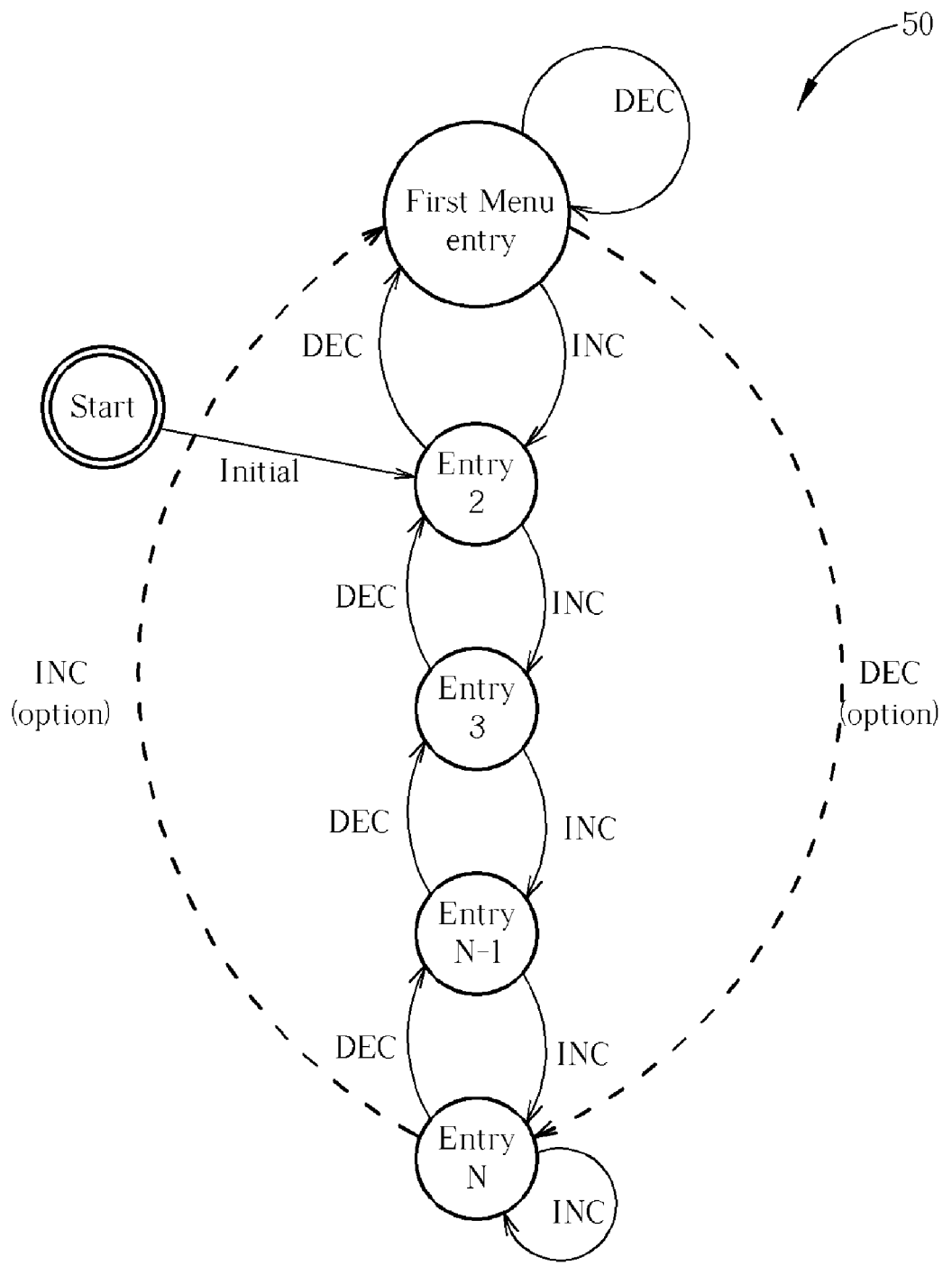
FIG. 5 is a diagram of a state machine providing interactive navigation features for a DVD using the button information table according to the present invention.

FIG. 5 illustrates a first such method 50 using a physical enumeration of the menu buttons in the Button_Information_Table (BTNIT in PCI; [DVD,96], 4.4.3.4.) directly to form a linear list of the menu buttons. BTNIT consist of 1, 2, or 3 groups of buttons, depending on BTNGR_Ns (BTN_MD in PCI; [DVD,96], 4.4.3.2.(5)). Each group of buttons is here considered a separate list. Within each group BTNIT forms an indexed list, starting with button #1 to number of buttons defined in BTN_Ns (PCI; [DVD,96], 4.4.3.1.(7)). The navigation method 3.2 described here navigates this list by incrementing (INC) or decrementing (DEC) the actual index. It actually ignores Button_Offset (BTN_OFN in PCI; [DVD, 96], 4.4.3.1.(7)), so the list always start at #1 and BTN_Ns (PCI; [DVD,96], 4.4.3.1.(7)) defines the maximum button in the list.

An alternative method is collapsing the original menu graph using the adjacent button information AJBTN_POSI (BTNIT in PCI; [DVD,96], 4.4.3.4.) with a graph based algorithm to form the linear list, for example by translating INC/DEC operations into a search algorithm to use left/right/upper/lower adjacent button depending on the already visited nodes. For this algorithm the Auto_Action_Mode of an adjacent button (BTN_POSI in PCI; [DVD,96], 4.4.3.4.(a)) may have an impact in the search algorithm by either preferring or discarding buttons without selection state according to the embodiment.

Another alternative method uses a sorting algorithm to process the start and/or end X/Y coordinates of the buttons listed in BTN_POSI (BTNIT in PCI; [DVD,96], 4.4.3.4.) to collapse the buttons to a linear list.

Still another alternative method uses a graph parsing algorithm in order to find a linear list to go through the entire menu. Each item of the menu is considered as a node in the graph, and it has 4 neighbors (a neighbor can be void or another node) as shown in FIG. 4.

Figure 1:
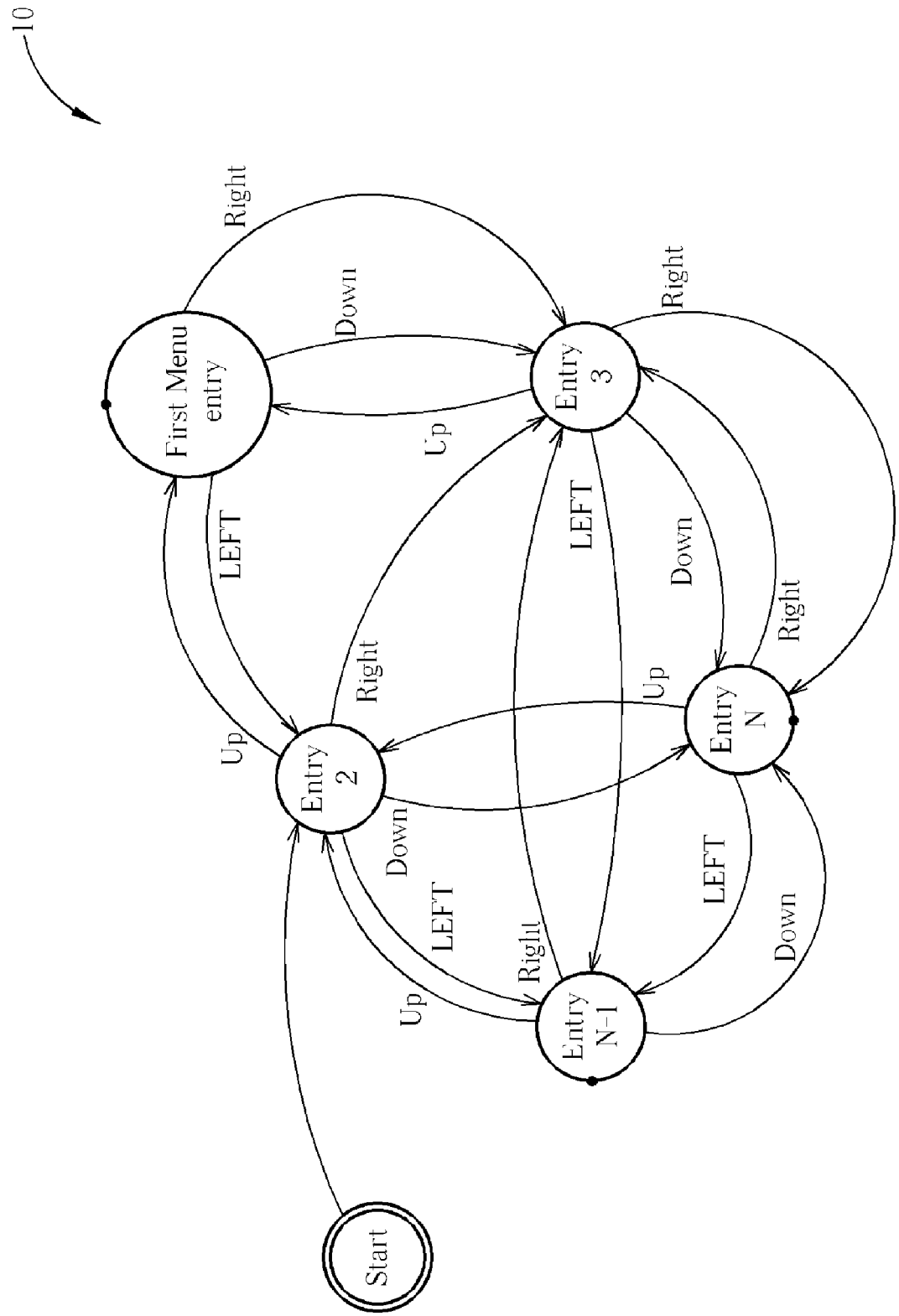
FIG. 1 is a diagram of a state machine providing interactive navigation features for a DVD according to the prior art.
Figure 2:
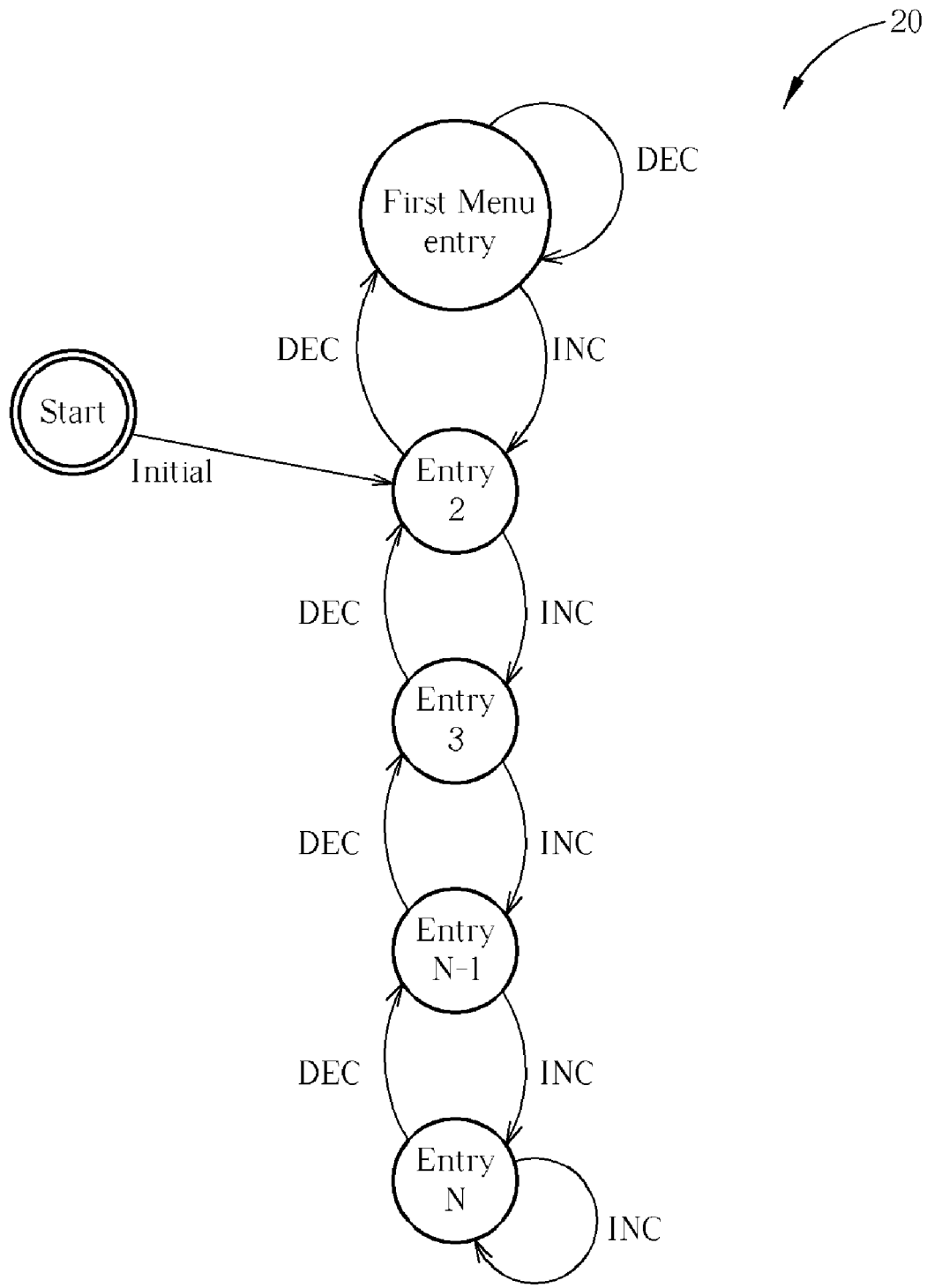
FIG. 2 is a diagram of a state machine providing linear interactive navigation features for a DVD according to the present invention.
Figure 3:
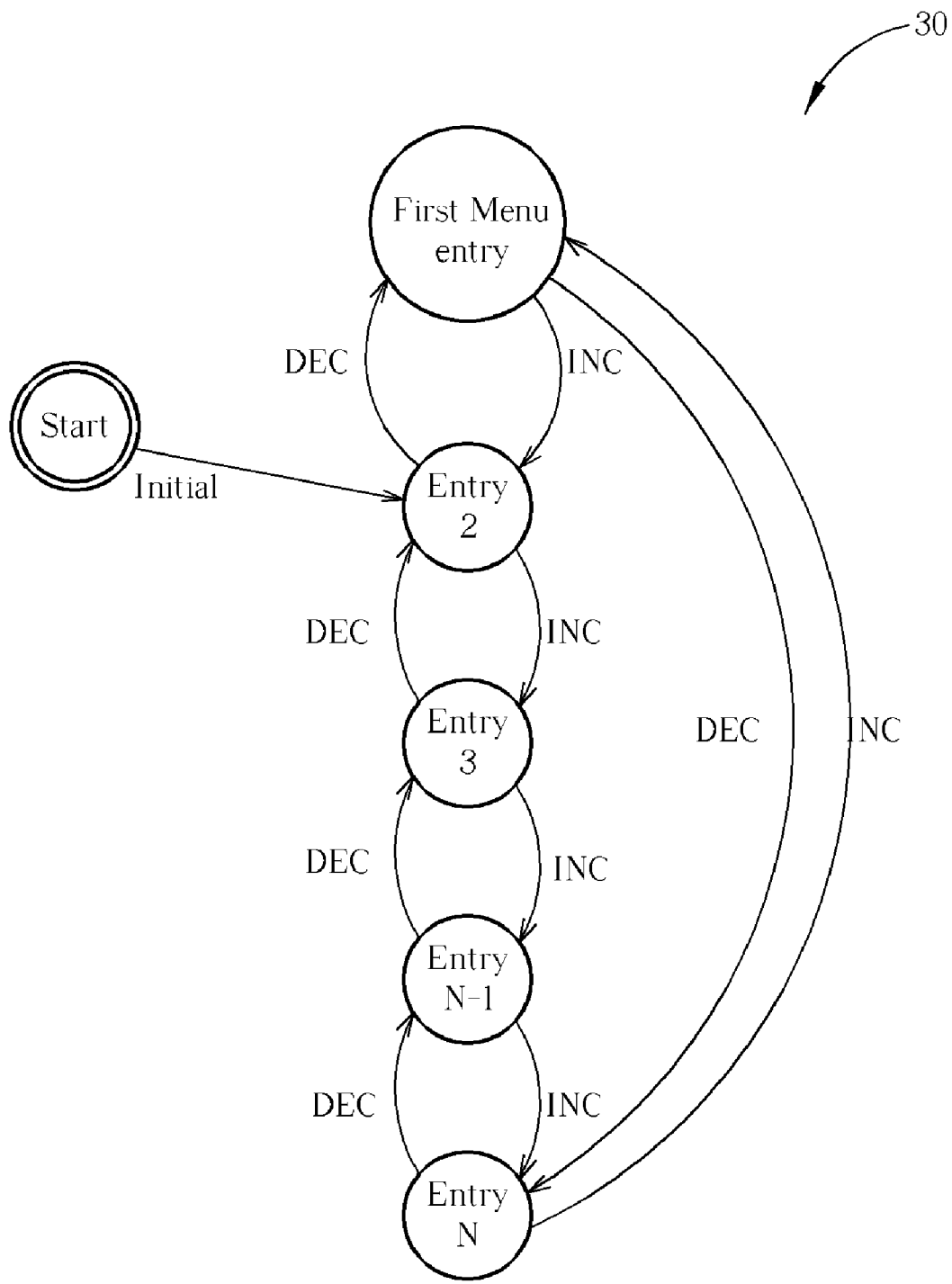
FIG. 3 is a diagram of a state machine providing circular interactive navigation features for a DVD according to the present invention.

However the list is formed, once formed, design consideration can determine whether the list is navigated linearly as in FIG. 2 or circularly as in FIG. 3.

The main user input may use a rotary knob, whose rotation is translated to the 2-directional user input (INC, DEC). In some embodiments, the rotary knob may have a 3rd action in addition to both rotary directions, such as an axial press. This 3rd action may be used for selecting the currently highlighted menu button with Button_Activate( ) ([DVD,96], Annex J). The user input might alternatively be a 2-directional button input, e.g. up/down or left/right as long as only 2 directional inputs (INC, DEC) are given. The Auto_Action_Mode (BTN_POSI in PCI; [DVD,96], 4.4.3.4.(a)) of a button should be suppressed to allow skipping a button with a forced action attribute to allow user navigation without automatic and unintended activation of the button. If the Auto_Action_Mode (BTN_POSI in PCI; [DVD,96], 4.4.3.4.(a)) of a button is not suppressed, a delay preferably is used before a selected button, that has a forced action attribute, is activated to allow skipping the button without activation during user navigation.

The user input alternatively can be an only 1-directional user input. The menu navigation sequence described above is then made cyclic (as shown in FIG. 3 and FIG. 5), so it is possible to select all menu items by only step navigating to the next menu entry in the list. Two alternative methods, shown in FIG. 6 and FIG. 7, are described to derive a cyclic menu navigation sequence.

Figure 6:
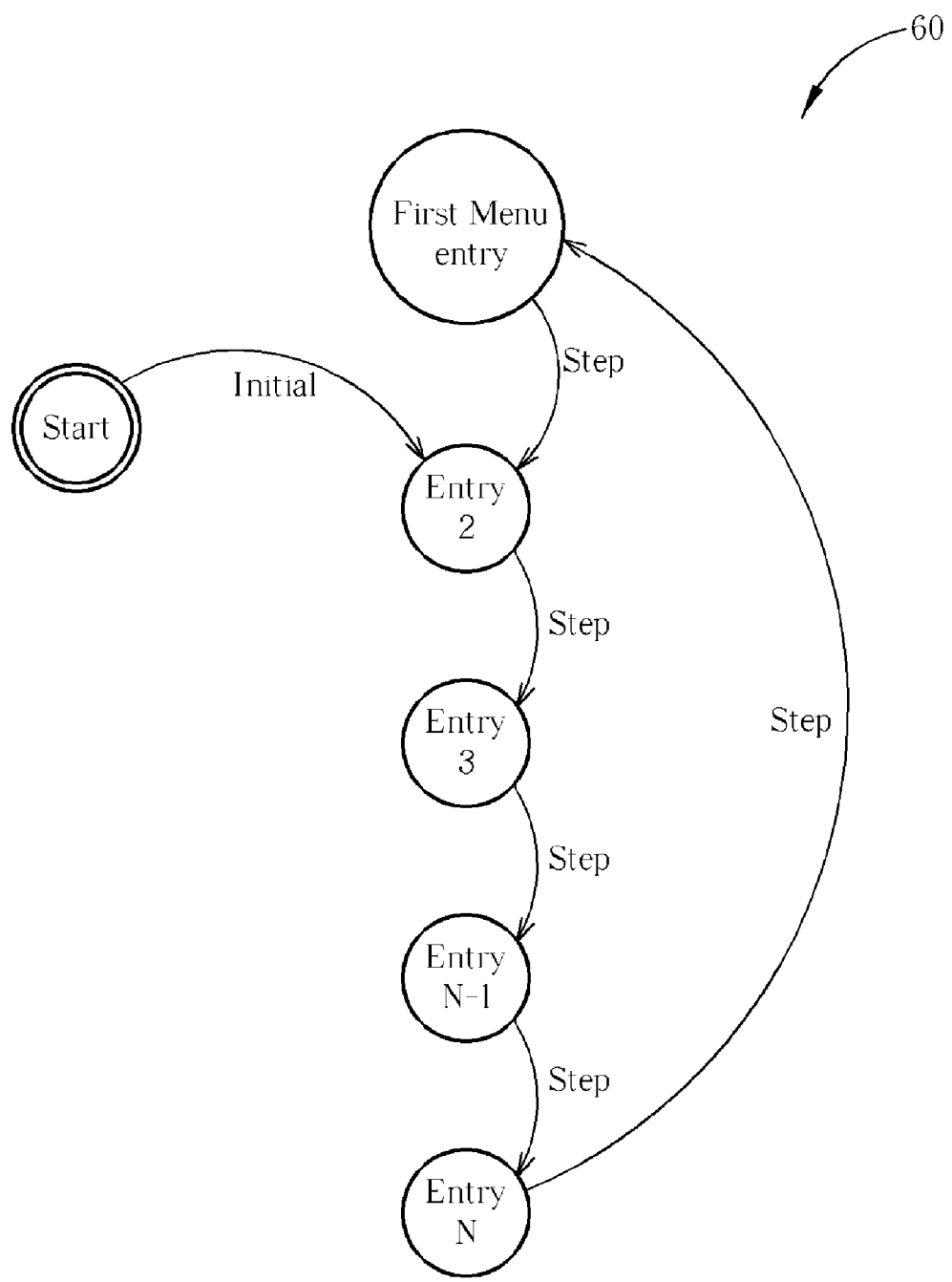
FIG. 6 is a diagram of a state machine providing interactive navigation features for a DVD using a linear list formed from the graph of FIG. 4 according to the present invention.
Figure 7:
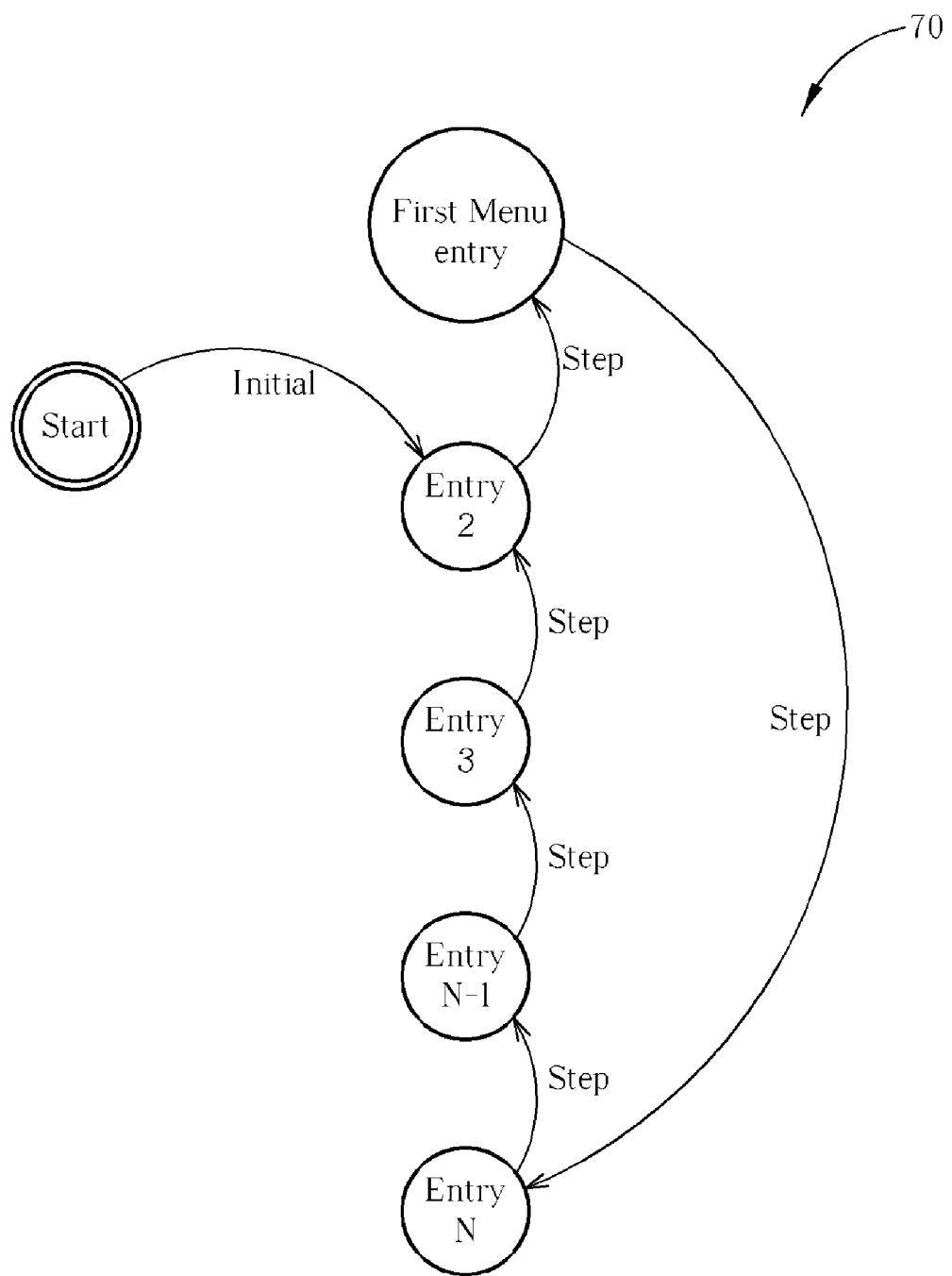
FIG. 7 is a diagram of another state machine providing interactive navigation features for a DVD using a linear list formed from the graph of FIG. 4 according to the present invention.

When utilizing a 1-directional user input, each step in the menu item index will always increment similar to the state machine 60 in FIG. 6, or decrement similar to the state machine 70 in FIG. 7. When reaching the last entry (Entry N) in FIG. 6, an additional step will return control to the first menu entry and start the navigation list again. Conversely in FIG. 7, when reaching the first entry, an additional step will return control to the last menu entry (Entry N) and start the navigation list again. The initial menu entry after Start is determined by FOSL_BTNN (PCI; [DVD,96], 4.4.3.1.(9)).

Figure 8:
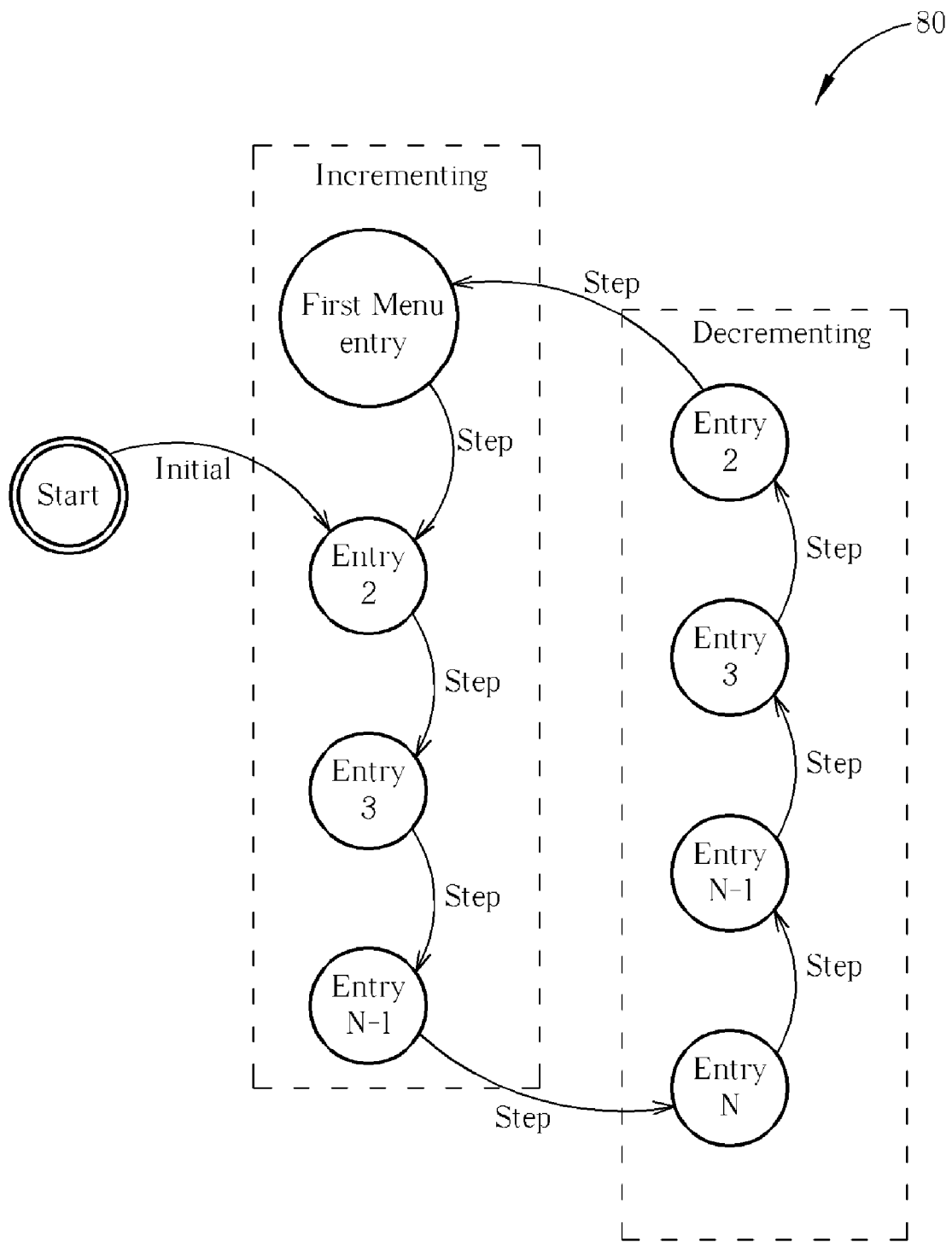
FIG. 8 is a diagram of another state machine providing interactive navigation features for a DVD using a linear list formed from the graph of FIG. 4 according to the present invention.

Another method for DVD menu navigation 80 using a 1-directional user input is shown in FIG. 8. When reaching the last item in the list (Entry N), the navigation will reverse the step direction, hence continuing the list in opposite direction until reaching the first item (First Menu Entry), whereupon the direction reverses again. The initial step direction can be incrementing or decrementing as the implementer's discretion. The initial menu entry after Start is determined by FOSL_BTNN (PCI; [DVD,96], 4.4.3.1.(9)).

Also covered by this invention is the use of a numeric index into the navigation list to select a specific entry, e.g. simulating [DVD,96], Annex J function Button_Select_and_Activate( ). Essential is that the physical numeric index of the button in BTNIT is used and NSL_BTN_Ns (PCI; [DVD,96], 4.4.3.1.(8)) is not used to limit the number of buttons available for section. Hence all present buttons (BTN_Ns in PCI; [DVD,96], 4.4.3.1.(7)) are selectable by direct numeric selection.

For the method that uses a graph parsing algorithm in order to find a linear list, each node has 4 neighbors, with each neighbor node respectively referred to herein as LeftN, RightN, UpN, and DownN. In use, the "N" in LeftN, RightN, UpN, and DownN is to be replaced by the index number of the respective node. As stated, a neighbor of a node can be either another node or a void (no link to that node). Please refer back to FIG. 4 for reference. One of the following methods can be used.

A first method entails clockwise parsing of the menu graph 40 (can be taken as action for the right rotation of the rotary knob). If the first node (Node 1) has a node neighbor to the left then the actual node of Node 1 becomes Right1 (RightN where N=1), if not then progress towards the next clockwise direction (Down=DownN). If DownN is not a node then progress to the next direction clockwise (Left=LeftN). If LeftN is not a node then progress to the next direction clockwise (Up=UpN). When reaching a node in this navigational way and navigation to the next node is desired, the first direction to be tried is the next direction clockwise with respect to the direction from which this point was reached. For example, if the current node was reached from its predecessor from the left (the predecessor is to the left of the current node), the next direction for navigation will be up. Parsing the example graph shown in FIG. 4 would be done as follows:

Node 1→try right→void→try down→Node 4 reached→try right→Node 5 reached→try up→Node 2 reached→try left→void→try up→void→try right→void→try down→Node 5 reached→try right→Node 6 reached→try up→void→try right→void→try down→Node 9 reached→try right→void→try down→Node 10 reached→try right→void→try down→void→try left→void→try up→Node 9 reached→try left→void→try up→Node 6 reached→try left→Node 5 reached→try down→void→try left→Node 4 reached→try down→node 8 reached→try right→void→try down→void→try left→Node 7 reached→try down→void→try left→void→try up→Node 3 reached→try left→void→try up→void→try right→Node 4 reached→try up→Node 1 reached.

As it can be seen, with such a clockwise parsing method all the nodes have been reached, the end point being again the first node.

A similar method entails counter-clockwise parsing of the menu graph 40 (can be taken as action for a step rotation of the rotary knob), the difference being that the parsing is done in the counter-clockwise direction so that the order of the tried directions is Left→Down→Right→Up.

The navigation input with a reduced number of buttons described here can be used in all DVD Video player devices that have limited space for user input devices, e.g. key pad buttons. This can be in mobile or automotive use DVD Video players, or in devices that limit input functions numbers (e.g. key pad buttons) for design reasons or simplified operation.

Those skilled in the art will readily observe that numerous modifications and alterations of the device and method may be made while retaining the teachings of the invention.

What is claimed is:

1. A method of DVD menu button selection comprising:
reading a Button_Information_Table from a DVD, wherein the navigation of the menu buttons according to the Button_Information_Table is achieved by at least three directions;
using a physical enumeration of menu buttons in the Button_Information_Table directly to rebuild an indexed linear list of the menu buttons, wherein the navigation of the menu buttons according to the indexed linear list of the menu buttons is achieved by a maximum of 2 directions;
navigating sequentially through the indexed linear list of menu buttons to a desired menu button according to user inputs, and suppressing an Auto_Action_Mode originally defined in the DVD; and
selecting the desired menu button according to a predetermined user input.

2. The method of claim 1 wherein navigating sequentially through the indexed linear list of menu buttons comprises incrementing or decrementing an actual index of the indexed linear list.

3. The method of claim 1 further comprising ignoring Button_Offset information read from the DVD when forming the indexed linear list.

4. The method of claim 1 wherein navigating sequentially through the linear list of menu buttons comprises incrementing or decrementing an index of the linear list.

5. A method of DVD menu button selection comprising:
reading a Button_Information_Table from a DVD, wherein the Button_Information_Table includes original menu graph information and adjacent button information, and the navigation of the menu buttons according to the Button_Information_Table is achieved by at least three directions;
collapsing the original menu graph using the adjacent button information with a graph based algorithm to rebuild a linear list of menu buttons, wherein the navigation of the menu buttons according to the linear list of menu buttons is achieved by a maximum of 2 directions;
navigating sequentially through the linear list to a desired menu button according to user inputs, and suppressing an Auto_Action_Mode originally defined in the DVD; and
selecting the desired menu button according to a predetermined user input.

6. The method of claim 5 further comprising translating INC/DEC operations into a search algorithm to use a left/right/upper/lower adjacent button depending on already visited nodes of the menu graph.

7. The method of claim 6 wherein the graph based algorithm impacts the search algorithm by preferring buttons without selection state.

8. The method of claim 6 wherein the graph based algorithm impacts the search algorithm by discarding buttons without selection state.

9. A method of DVD menu button selection comprising:
reading a Button_Information_Table from a DVD, wherein the Button_Information_Table includes start and/or end X/Y coordinates of menu buttons, and the navigation of the menu buttons according to the Button_Information_Table is achieved by at least three directions;
sorting the coordinates of the menu buttons to collapse the menu buttons to rebuild a linear list of menu buttons, wherein the navigation of the menu buttons according to the linear list of menu buttons is achieved by a maximum of 2 directions;
navigating sequentially through the linear list to a desired menu button according to user inputs, and suppressing an Auto_Action_Mode originally defined in the DVD; and
selecting the desired menu button according to a predetermined user input.

10. The method of claim 9 wherein navigating sequentially through the linear list of menu buttons comprises incrementing or decrementing an index of the linear list.

11. A method of DVD menu button selection comprising:
reading a Button_Information_Table from a DVD, wherein the Button_Information_Table includes adjacent button information, and the navigation of the menu buttons according to the Button_Information_Table is achieved by at least three directions;
generating a graph of menu functions, locating and linking menu functions in the graph according to the adjacent button information;
collapsing the graph of menu functions to rebuild a linear list of menu functions, wherein the navigation of the menu functions according to the linear list of menu functions is achieved by a maximum of 2 directions;

navigating sequentially through the linear list to a desired menu function according to user inputs, and suppressing an Auto_Action_Mode originally defined in the DVD; and selecting the desired menu function according to a predetermined user input.

12. The method of claim 11 where the adjacent button information is ignored as a main dependency of the menu functions when collapsing the graph of menu functions into the linear list of menu functions.

13. The method of claim 11 wherein each menu function is considered as a node in the graph, and has 4 neighbors.

14. The method of claim 11 wherein each of the menu functions corresponds to a unique index of the linear list.

15. The method of claim 14 wherein navigating sequentially through the linear list of menu functions comprises incrementing or decrementing a current index of the linear list.

16. The method of claim 11 wherein a graph parsing algorithm is used to include the entire menu in the linear list.

* * * * *